(12) United States Patent
Willoughby (10) Patent No.: US 7,117,202 B1
(45) Date of Patent: Oct. 3, 2006

(54) SYSTEM AND METHOD FOR COMPUTER BASED SEARCHES USING GENETIC ALGORITHMS

(75) Inventor: Douglas A. Willoughby, Bloomfield Hills, MI (US)

(73) Assignee: Sun Microsystems, Inc., Santa Clara, CA (US)

( * ) Notice: Subject to any disclaimer, the term of this patent is extended or adjusted under 35 U.S.C. 154(b) by 410 days.

(21) Appl. No.: 10/610,618

(22) Filed: Jun. 30, 2003

(51) Int. Cl.
G06F 17/30 (2006.01)

(52) U.S. Cl. .................. 707/3; 707/2; 707/4; 707/5; 707/10; 707/102; 709/200; 709/201; 709/202; 709/203

(58) Field of Classification Search .......... 379/114.01, 379/114.02, 112.01, 115.02, 116; 705/412, 705/37, 74, 26; 707/4, 2, 3, 5, 102; 709/206, 709/200, 201, 202, 203

See application file for complete search history.

(56) References Cited

U.S. PATENT DOCUMENTS

| | | | | |
|---|---|---|---|---|
| 4,799,156 A | * | 1/1989 | Shavit et al. | 705/26 |
| 5,168,446 A | * | 12/1992 | Wiseman | 705/37 |
| 5,606,602 A | * | 2/1997 | Johnson et al. | 379/114.02 |
| 5,819,238 A | * | 10/1998 | Fernholz | 705/36 R |
| 5,917,897 A | * | 6/1999 | Johnson et al. | 379/114.02 |
| 5,923,846 A | * | 7/1999 | Gage et al. | 709/213 |
| 5,995,602 A | * | 11/1999 | Johnson et al. | 379/116 |
| 6,005,925 A | * | 12/1999 | Johnson et al. | 379/115.02 |
| 6,023,510 A | * | 2/2000 | Epstein | 705/74 |
| 6,047,274 A | * | 4/2000 | Johnson et al. | 705/412 |
| 6,167,124 A | * | 12/2000 | Johnson et al. | 379/112.01 |
| 6,269,157 B1 | * | 7/2001 | Coyle | 379/114.01 |
| 6,373,929 B1 | * | 4/2002 | Johnson et al. | 379/114.02 |
| 6,598,029 B1 | * | 7/2003 | Johnson et al. | 705/37 |
| 6,691,109 B1 | * | 2/2004 | Bjornson et al. | 707/4 |
| 6,968,362 B1 | * | 11/2005 | Koch et al. | 709/206 |
| 2002/0091626 A1 | * | 7/2002 | Johnson et al. | 705/37 |
| 2002/0169716 A1 | * | 11/2002 | Johnson et al. | 705/40 |
| 2003/0023540 A2 | * | 1/2003 | Johnson et al. | 705/37 |
| 2003/0033238 A1 | * | 2/2003 | Oskielunas et al. | 705/37 |
| 2004/0015428 A2 | * | 1/2004 | Johnson et al. | 705/37 |
| 2004/0015433 A1 | * | 1/2004 | Johnson et al. | 705/37 |

OTHER PUBLICATIONS

Parkes et al. An Auction-Based Method for Decentralized Train Scheduling, ACM, Agents May 28-Jun. 1, 2001, Montreal, Quebec, Canada, pp . 43-50.*

Wurman et al., The Michigan Internet AuctionBot: A Configurable Auction Server for Human and Software Agents, ACM, Autonomous Agents, 1998, Minneapolis MN USA. pp. 301-308.*

Bredin, Market-Based Resource Control for Mobile Agents, ACM, Autonomous Agents, 1998, Minneapolis MN USA, pp. 197-204.*

* cited by examiner

*Primary Examiner*—Frantz Coby
(74) *Attorney, Agent, or Firm*—Kent A. Lembke; William J. Kubida; Hogan & Hartson LLP (57) ABSTRACT

A system for conducting a computer based search that includes a bidding bulletin board to post a user search query from a user, an agent that submits a bid to the bidding bulletin board in response to the query, where the agent is associated with a search result, and a display server to display the search result if the bidding bulletin board accepts the bid, where an amount bid is determined by behavioral rules for the agent. Also, a method that includes the steps of posting a user search query from a user on a bidding bulletin board, receiving a bid from an agent at the bidding bulletin board in response to the query, where the agent is associated with a search result, and displaying the search result if the bulletin board accepts the bid, where the amount bid is determined by behavioral rules for the agent.

21 Claims, 7 Drawing Sheets

SYSTEM AND METHOD FOR COMPUTER BASED SEARCHES USING GENETIC ALGORITHMS

BACKGROUND OF THE INVENTION

1. Field of the Invention

The present invention relates, in general, to systems and methods of refining dynamic fitness functions of genetic algorithms. More specifically, the present invention includes systems and methods of refining search-based fitness functions based on user-selected search results.

2. Relevant Background

Conventional Internet search engines use heuristics to determine which web pages are the best match for a keyword search. This process includes measuring the relevancy of a web page based on the number of times the page is cited by (or hyperlinked to) other web pages.

This method of measuring relevancy is inherently bias towards selecting older web pages that have had more time to develop cites and links to other web pages. Unfortunately, the information found on these older web pages is more likely to have outdated information than more recently created web pages. This bias can actually slow the dissemination of new information displayed on new web pages.

Another problem with conventional search engines is their inability to use semantics and contextual associations while searching keywords. For example, when a user inputs the keyword "title" into a conventional search engine, the engine cannot differentiate whether "title" refers to the title of a book or whether "title" refers to a house or car title. Thus, there remains a need for search engines that are more discriminating about semantic differences in words like humans.

One approach to these and other problems with conventional search engines is to use genetic algorithms (also called genetic programs) that can provide globally optimum solutions in problem spaces that cannot be well defined mathematically. These problem spaces generally involve complex tradeoffs between competing considerations, and the genetic algorithm attempts to determine the best balance between competing considerations.

A problem with genetic algorithms, however, is that they are difficult to implement when the relative quality of the results are dynamic or difficult to completely define. For example, the quality of a keyword search depends on the semantics of the keywords and their contextual association with each other. These semantics are dynamic and context dependent, making them difficult to implement in a genetic algorithm.

A similar problem occurs in searches of rich media depositories that contain substantial amounts of graphical and/or pictorial information. The textual metadata associated with this kind of data generally provides an incomplete description, if such metadata descriptions are present at all. Like keywords, the metadata depends on semantics and is difficult to search effectively with genetic algorithms. Thus, there remains a need for systems and methods that employ genetic algorithms that work effectively with dynamic and difficult to define semantics of human language.

SUMMARY OF THE INVENTION

Briefly stated, one embodiment of the invention is a system for conducting a computer based search that includes a bidding bulletin board to post a user search query from a user, an agent that submits a bid to the bidding bulletin board in response to the user search query, where the agent is associated with a search result, and a display server to display the search result to the user if the bidding bulletin board accepts the bid of the agent, where an amount bid by the agent is determined by behavioral rules for the agent.

Another embodiment of the invention is a method for conducting a computer based search that includes posting a user search query from a user on a bidding bulletin board, receiving a bid from an agent at the bidding bulletin board in response to the user search query, where the agent is associated with a search result, and displaying the search result to the user if the bulletin board accepts the bid of the agent, where the amount bid by the agent is determined by behavioral rules for the agent.

Additional novel features shall be set forth in part in the description that follows, and in part will become apparent to those skilled in the art upon examination of the following specification or may be learned by the practice of the invention. The features and advantages of the invention may be realized and attained by means of the instrumentalities, combinations, and methods particularly pointed out in the appended claims.

DETAILED DESCRIPTION OF THE PREFERRED EMBODIMENTS

Genetic algorithms represent a technique to search for globally optimum solutions in problem spaces that cannot be completely defined mathematically. These problem spaces involve complex tradeoffs between competing considerations. What is actually being searched for is the best balance between competing considerations.

A genetic algorithm is associated with a fitness function that defines the relative quality of solutions within a problem space. The fitness function attempts to capture the appropriateness of the solution presented by the genetic algorithm. The ability to correctly define an appropriate fitness function, including the parameters that define the function as well as the appropriateness of solutions, defines the kinds of problems that can be solved by genetic algorithms.

The present invention includes systems and methods of formulating fitness functions where the relative quality of the most appropriate solution is dynamic (e.g., subject to change over time) and/or difficult to define mathematically.

These types of fitness functions may be formulated and refined by the selection preferences of one or more users who select a best fitness value from a group of fitness values characterized by the fitness function. Through successive selections of a "best" fitness value from a group of fitness values, the fitness function is continually refined to measure the appropriateness of solutions generated by the genetic algorithm.

Figure 1:
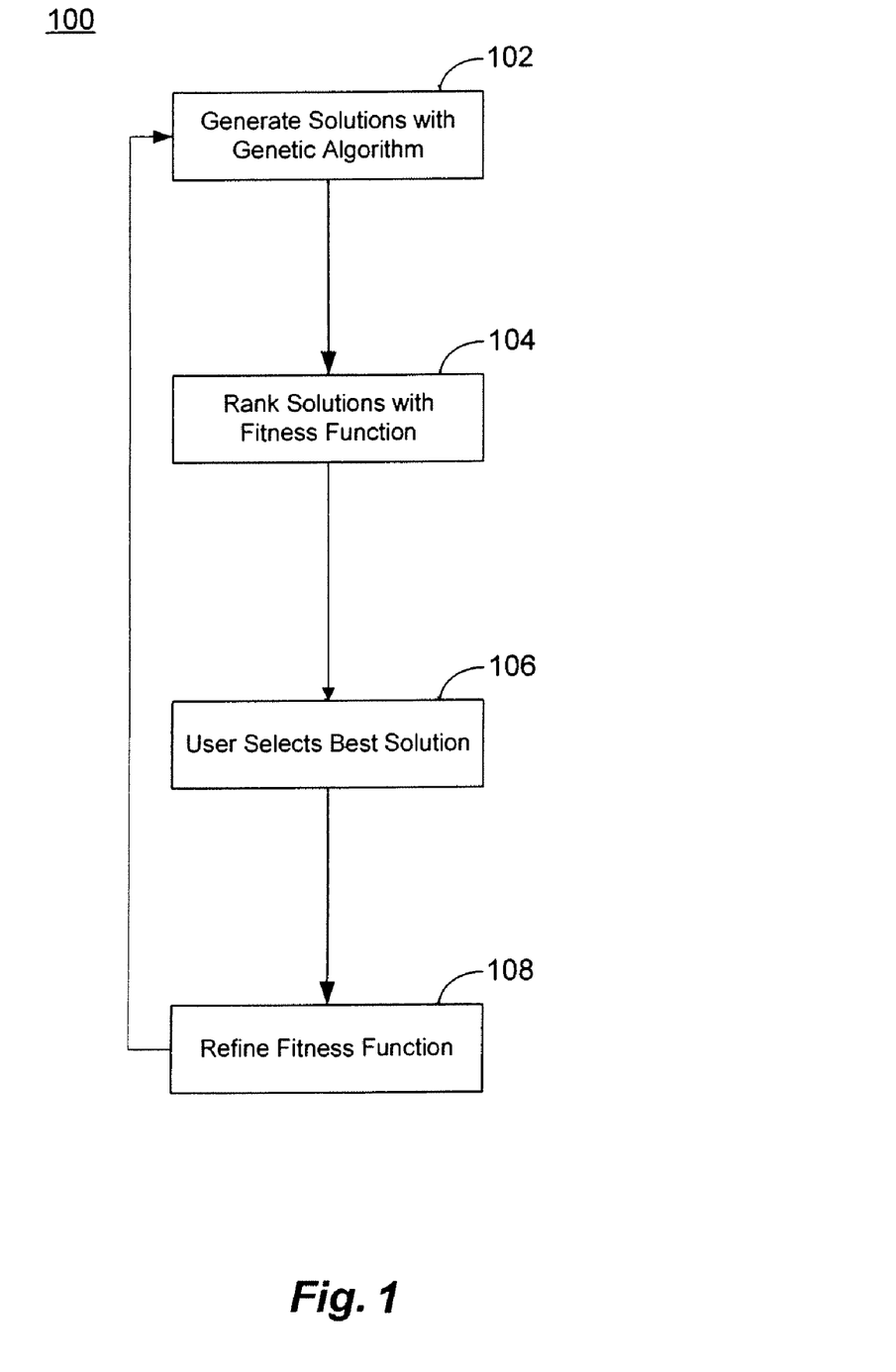
FIG. 1 illustrates a flowchart of refining a fitness function according to an embodiment of the invention.

Referring now to FIG. 1, a flowchart illustrating a method 100 of refining a fitness function according to an embodiment of the invention is shown. The method 100 starts with the generation of solutions 102 using a genetic algorithm. The solutions are ranked by a fitness function 104 associated with the genetic algorithm, and the ranked solutions are presented to a user who selects the "best" solution 106.

The "best" solution is a solution that the user thinks is the most appropriate solution from the set of generated solutions at the time she or he makes the selection. The user selection preferences for selecting the best solution may be difficult to articulate and quantify, and may change over time. Thus, fitness functions that rank the appropriateness of solutions have to be able to adapt to unquantifiable and constantly changing user selection preferences.

Fitness functions adapt by being refined 108 based on the selection of the best solution by the user. Refining a fitness function 108 in this way does not require the modification of pre-defined ranking criteria for the fitness function. As noted above, such criteria may not exist because user selection preferences are difficult to quantify and continuously changing.

The next set of solutions generated by the genetic algorithm is then ranked with the refined fitness function. The user again selects a best solution from the set of solutions and the fitness function is again refined based on the user's selection of a best solution. This process may be repeated so that the fitness function is continuously refined to adapt to the selection preferences of users.

It should be noted that mutations may be introduced into the fitness function to prevent a feedback cycle between user selections and the refined fitness function that forecloses the possibility of new solutions. The mutation may take the form of a solution selected at random that is raised in the solution rankings so that it is more likely to come to the attention of a user.

In instances of bad mutations, a user still does not select the higher ranked solution and the solution falls back to a ranking in conformity with user selection preferences. On the other hand, in instances of good mutations, the user selects the solution and the fitness function is refined to keep the solution in a higher ranked position than before the mutation occurred.

The above-described method of refining a dynamic fitness function has numerous practical applications. One such application is search programs for performing keyword searches of electronically stored information. This application includes searching information that is localized in a database associated with a single storage device, such as a computer hard drive, optical storage drives like a CD-ROM or DVD-ROM, semi-conductor based memory devices, and tape drives, among other kinds of storage devices. The application also includes searching information that is distributed across an electronic information network such as a Local Area Network (LAN), a Wide Area Network (WAN), and the Internet, among other kinds of networks.

With regards to search programs for the Internet, the quality of the program depends in part on the quality of the association between a user's search query and the web pages presented in response to that query. Good associations may be difficult to predict and form beforehand in an environment that is as dynamic as the Internet. The association-based learning method and system of the present invention establishes these associations through goal-oriented behaviors of the system's participants.

The system may be thought of as an auction place where users present search queries and invite bidders, referred to as agents, to bid for the opportunity to present query results (e.g., web pages). When the user selects a web page that is the best match to the search query, the agent representing that web page is rewarded with capital. The amount of capital that the winning agent receives may be proportional to the size of the bid the agent made to get the opportunity to present the selected web page to the user. While high bidding by agents can reap big rewards when the agent's web page is selected, it can also result in large losses if the page is not selected. An agent who is a losing bidder loses capital in the form of a non-refundable "publication fee" that is proportional to the size of the agent's bid.

An example of a search system for the Internet includes one or more agents who offer candidate web pages in response to a user's search query. These agents may be distributed object instances that appear to a web browser (e.g., the Microsoft Internet Explorer or Netscape Navigator) as web pages. The agents bid for the opportunity to present web pages they represent to the user. The more confident the agent is that the user will select one of its web pages in response to a query, the more the agent will bid to present the page to the user.

The agent has an interest in closely matching its web pages to the user's query for a number of reasons: One reason is that close matches increase the possibility that the agent's bid is accepted and presented to the user. Another reason the agent wants a close match is that the agent loses capital when a bid is accepted but not selected by the user. In order to minimize the chances for a losing outcome, the agent should carefully evaluate the contents of the pages it represents and the likelihood of those pages being selected by the user.

The agents may exist in a repository that is a loosely coupled, adaptive environment in which the agents compete for control of web pages. Competition between agents may be based on the notion of "capital." Capital is what the agents use to bid for control of new web pages. The more capital an agent acquires, the more likely it is to acquire additional pages. Agents acquire web pages to increase their chances of providing useful web pages to users. The agent is paid additional capital whenever a user selects a web page presented by an agent in response to a query. Agents are motivated to acquire more capital for reasons of self-preservation because agents that run out of capital are liquidated.

The competition for capital begins when a user makes a query about a specific subject. In response, competing agents may propose the web pages they that they have spent capital to be associated with as potential candidates to resolve the user's query. The user then selects the web page that appears most promising. A user may select the web page by, for example, directing a mouse pointer to a hypertext link for the selected web page and clicking on that link.

The agent that presents the selected web page is paid capital, while the agents of non-selected web pages may not receive any capital. The selection of a web page from the set of presented web pages is a proxy for the appropriateness of that page as a response to the user's query. Agents who bring the most appropriate web pages to the user are rewarded with capital that allows them to survive and grow in the search engine environment. In contrast, agents that present a lot of non-selected web pages run out of capital and cease to exist. This competition between agents, including the capital transaction for the selected query result, may be transparent to the user who simply sees the selected web page appear in the web browser window.

When an agent wishes to respond to a query, it bids some amount of capital for the right to respond. The amount of capital a given agent my bid depends on the agent's determination of the probability that the user will select a web page presented by the agent.

Given the limited amount of viewable space on an open page of a web browser, not every bid may be accepted and displayed to the user. The bids may be accepted in order from the highest bid to the lowest. Alternatively, bids may be assigned a probability of acceptance that is based on the bid amount, but does not guarantee that the bid of an agent who bids more will always be accepted over an agent who bids less.

To prevent a search environment where every agent automatically places a bid in response to a query, a publication fee is introduced. When an agent's bid is accepted for display, the agent must pay a publication fee that is a portion of the bid. On the other hand, bids that are not accepted for display may not cost the agent anything.

In one example, when a bid is accepted for display and the user selects the bid, the agent is rewarded with the bid amount. On the other hand, agents whose web pages are not selected suffer a net loss of capital because they have paid a publication fee and received no additional capital. Thus, in this example, an agent that bids high for every query, even when its web pages are not a good match, quickly runs out of capital and gets liquidated.

The information associated with the bids that are offered by the agents may comprise "clusters" of information. A cluster is a HTML string, typically a summary of the pages that the agent represents with hypertext links to the actual information providers. A display server may display the bid information in clusters.

Agents can develop a tendency to form the largest cluster possible in order to maximize the potential of their bids being accepted by a user. Such behavior may increase the potential rewards for the agent, but overwhelm the user with irrelevant information. In one example, this agent behavior is checked by the Display Server's desire to maximize its publication fee. Given a limited amount of screen space, the display server benefits when the ratio of publication fee to cluster size is maximized.

In one example, the ordering is based on the amount bid per line of display. The display server divides the amount bid by the number of lines to display the agent's response. Screen space is allocated to responses with the highest ratio of bid amount per display line. For example, a single line with a bid of 10 credits will be displayed before a ten line response bid at 90 credits. This example shows how tradeoffs between cooperation and competition increases the benefit of the search program to the user.

In another example, agents may use subordinate agents as suppliers (e.g., an object referenced by an agent's hypertext link). A supplier may be another agent or an actual web page. An agent may purchase suppliers, either from another agent or from the Free Producer Bulletin Board described below. Subordinates may also come about through agent reproduction or inter-agent agreements.

There may be several levels of indirection between a "root agent" and the information producers it represents (e.g., the actual web pages.) This tendency may be discouraged, however, if the subordinate agents are paid for their services as indirect agents. The more levels of indirection, the less of a "cut" the originating agent can take and still win the bidding process. Also, subordinate agents may be allowed to bypass the originating agent and bid directly, establishing the full value of the information they are offering to other agents.

Figure 2:
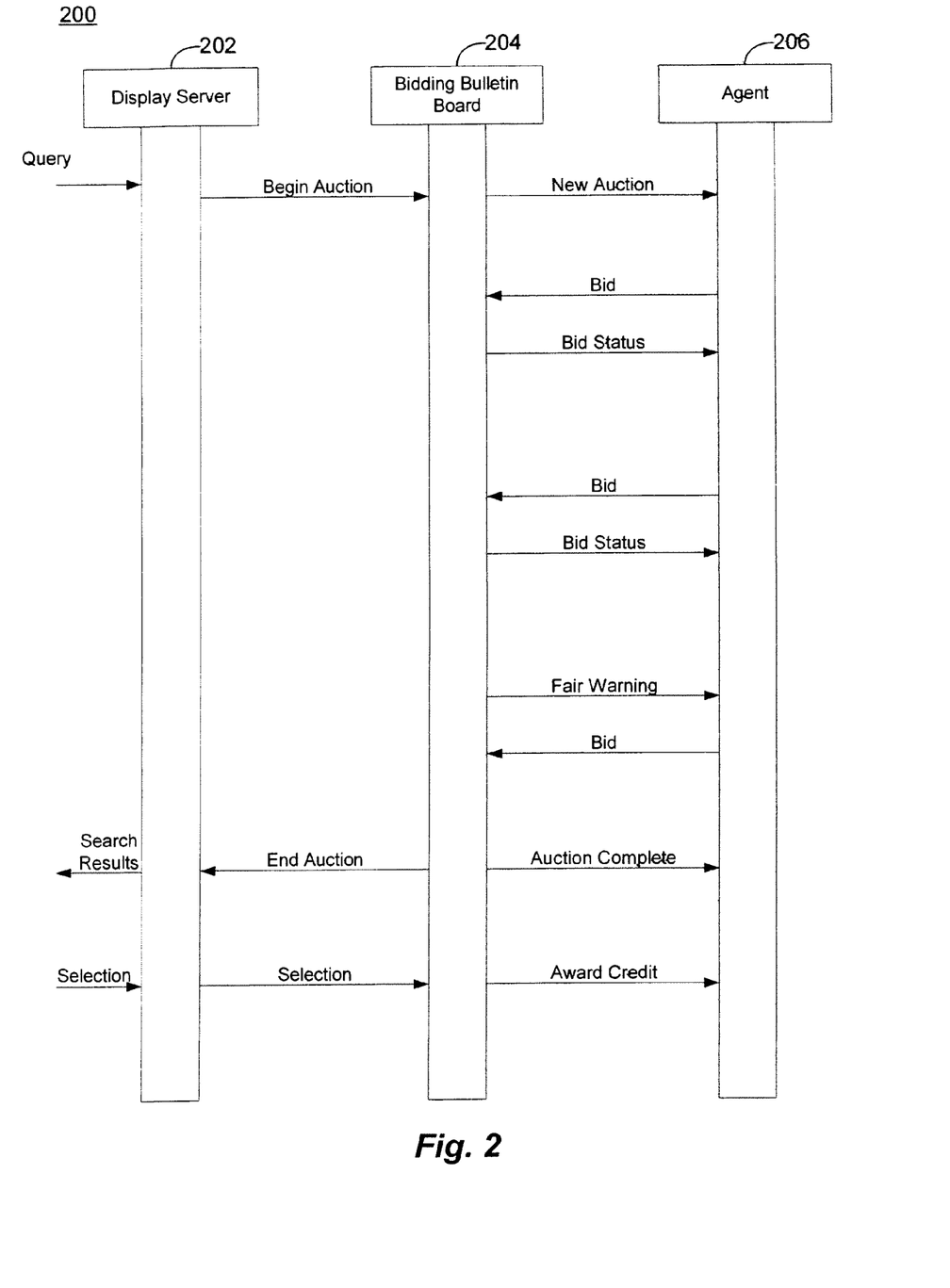
FIG. 2 shows a user search operation according to an embodiment of the invention.

FIG. 2 shows an example of a search system 200 comprising a display server 202, a bidding bulletin board 204 and an agent 206 whose activity is controlled by one or more genetic algorithms. In this example, the display server 202 accepts a query that has been input by a user and transfers the query to bidding bulletin board 204 to start a new auction event among the agents, including agent 206.

The bidding bulletin board 204 receives new queries from the display server 202 and initiates a new auction for the agents to bid based on the queries. When the agents discover the new action on the bidding bulletin board 204, they formulate a bidding strategy based on the query information and behavioral rules that are active in the agent.

Active behavioral rules may be a subset of all behavioral rules that an agent can have. For example, the complete set of behavioral rules may comprise 64 rules, and each agent's bidding behavior may differ depending on the combination of rules that are active in the agent.

Referring back to FIG. 2, agent 206 discovers (or may be alerted to) a new auction on bidding bulletin board 204 based on the user's search query and formulates a bidding strategy based on behavioral rules that are active in the agent. Agent 206 then composes a bid and sends it to bulletin board 204. The bulletin board 204 responds to the bid by informing agent 206 of the status of the bid.

In this example, agent 206 is informed that another agent (not shown) is the highest bidder and, based on its active behavioral rules, agent 206 decides to send another bid to bulletin board 204. The bulletin board 204 then informs agent 206 about the status of the new bid. The exchange of bids and status between agent 206 and bulletin board 204 may continue for several more iterations, until bulletin board 204 sends a fair warning announcement to all agents that the auction is about to close.

After fair warning is announced, agent 206 may have time for a limited number of additional bids (e.g., one more bid). After fair warning, the bulletin board 204 sends an announcement to all the agents that the auction has ended. Bids that come in after the auction has ended are ignored.

Placing a time constraint on the auction encourages agents to be efficient in deciding whether to bid during an auction. Agents that perform overly extensive searches will not have the opportunity to bid as often, and potentially lose out on rewards when they cannot submit a winning bid in time. In addition, subordinate agents charge to perform a search and the amount charged is based on the complexity of the search. Agents may use caching to shorten search times and avoid paying subordinate agents to repeat searches.

Once the auction has ended, bulletin board 204 compiles the accepted bids. Agents whose bids are accepted are charged a publication fee, which is deducted from an agent's overall credit position. When an agent's credit position reaches zero, the agent expires and no longer composes bids for future auctions.

The accepted bids, which represent search responses to the user's query, are sent to display server 202 and then arranged, for example, as entries on a web page for display on the user's web browser. The entries may be arranged as summaries and associated indexes of larger documents in order to reduce the network bandwidth consumed and the time needed to load the entries for display.

The user selects the winning entry among the accepted bids and the agent whose accepted bid was selected as the winning entry is awarded credit. Typically, the credit amount exceeds the bid acceptance fee, providing the successful agent with a net gain in its overall credit position.

It should be noted that while the search engine appears to the user as single machine with a single web access point, it may be implemented as a distributed environment. Agents, information producers, servers, and bulletin boards may run on an arbitrary number of machines. Object instances may be implemented as threadable entities so that they are capable of concurrent execution.

Agents may determine relationships based on external stimulus and internal behavioral rules. External stimulus may include observed outcomes of other agents in bulletin board auctions as well as its own auction experiences. An agent's internal behavioral rules may be a subset of a larger set of behavioral rules that make up a behavioral rule genome for the agents. The rules that are active (e.g., switched on) in a specific agent may be determined genetically through inheritance and random mutation.

An agent's active behavioral rules and history of external stimulus may form its internal model of the world. The agent uses its internal model to predict success in the bidding process. Feedback is immediate in the form of credits. The feedback is controlled by intelligent, goal-oriented behavior, that of a user looking for specific information. Some agents will be more successful than others. These agents will have the resources necessary to reproduce. Their combinations of active behavioral rules get passed down to successive generations. Unsuccessful agents are liquidated, and their associated web pages may be placed in a free producer bulletin board where they are acquired by other agents.

The system and method may also include the introduction of random mutations that can cause agents to offer seemingly random information in response to a user's query. If the random information has no relationship to the user's query, natural selection takes it course and the agent gets eliminated. On the other hand, if the information is selected by the user an intuitive association may form and strengthen.

In another aspect, the agents may be able to learn by observing a user's selection behavior. For example, agents may learn by observing that a user often follows a first query with a second query on another keyword. As a result, an observant agent may make an association between the two keywords and the next time the user searches for the first keyword, the agent may bid a document that uses the second keyword. If the association is valid, the agent will be rewarded and the association is reinforced. Through this process, seemingly unrelated documents can become associated.

Figure 3:
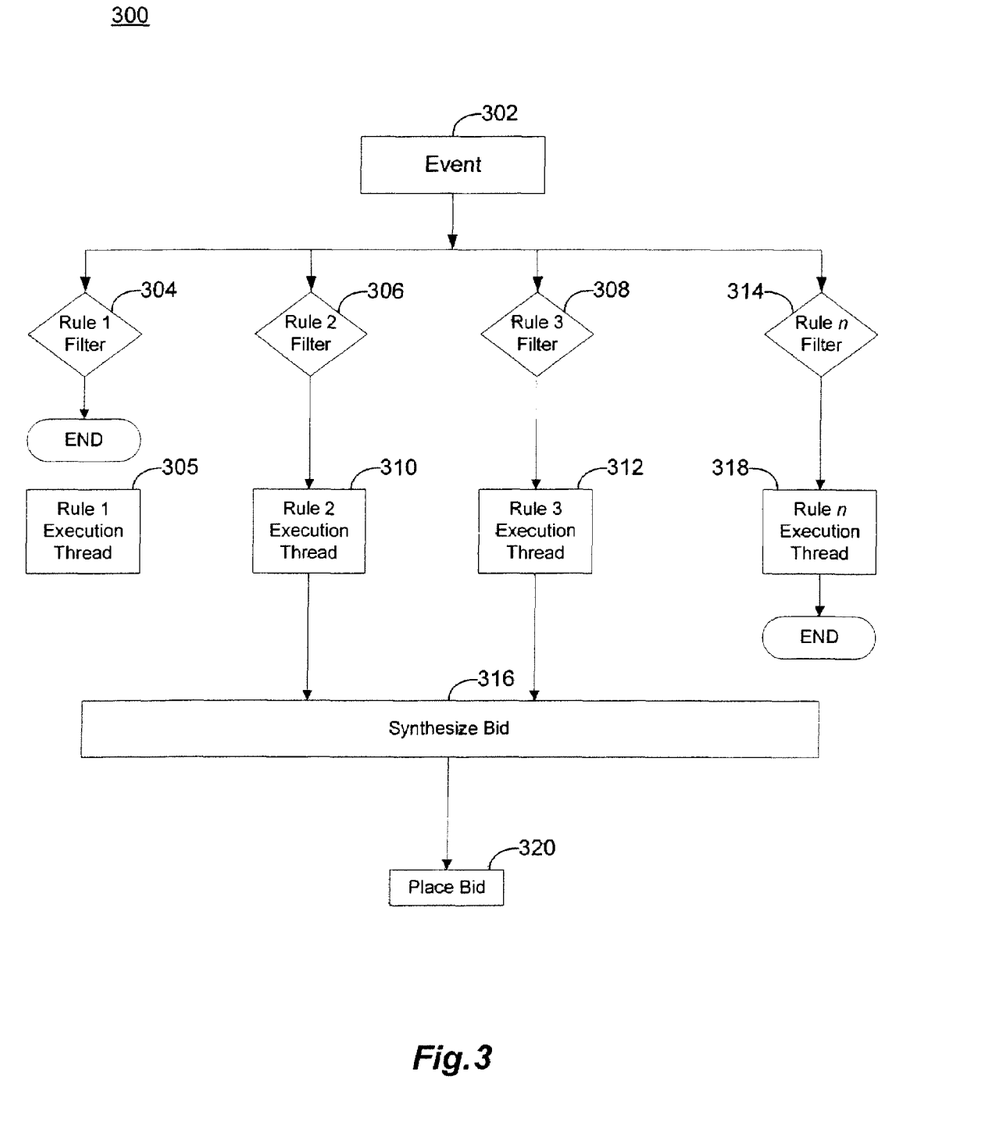
FIG. 3 shows how an agent's behavior rules affect the formation and placing of a bid according to an embodiment of the invention.

FIG. 3 shows an example of how an agent's behavioral rules can interact to formulate a biding strategy for an auction. In FIG. 3, the agent observes, or may receive a message about, an auction requesting bids to a user's query. In one example, this event 302 is processed by rule filters for each of the agent's active behavioral rules. The first rule, which is not concerned with auction behavior, has a filter 304 that blocks auction requests from triggering any of the rule's execution code 305. The second and third rules, on the other hand, are concerned with bidding on user queries and filters 306 and 308 permit information from bidding event 302 to be processed by the second and third rules' execution code 310 and 312.

When competing actions are requested of an agent by different behavioral rules, the actions may be synthesized together at a synthesis node 316. In this example, the second and third rule both generate bids in response to the biding event 302. The competing bids are combined into a single action by at synthesis node 316.

The combining of bids at the synthesis node 316 can be done in a number of ways. For example, combining may be done based on strait ordering where the first rule take precedence over the second rule, the second rule takes precedence over the third rule, and so on. In another example, a weighted filter may be used to change the order in which the behavioral rules take precedence over each other based on previous bid outcomes. The weighted filter may increase the probability of one rule taking precedence over another rule when a previous bid based on the rule was the winning search result selected by a user. The weighted filter may also reduce the probability of a rule taking precedence when a previous bid based on that rule was not successful.

Also in this example, the nth rule is concerned with bidding on user queries and so filter 314 passes information from bidding event 302 to the nth rule execution code 318. Here however, the behavioral information generated by the execution code of the nth rule 318 is not included with the other behavioral information that makes up the agent's bid. For example, the act of comparing keywords from a user search query with the information represented by the agent can be time consuming and expensive. Rule filter 314 may prevent the behavioral rule from creating a bid except when it recognizes that performing a keyword search for estimating a bid amount would likely be profitable for the agent. One such situation could be when there have already been a number of bids made in response to a user search query and the filter recognizes that it would not be profitable to make a bid that would be high enough to win the auction.

Figure 4:
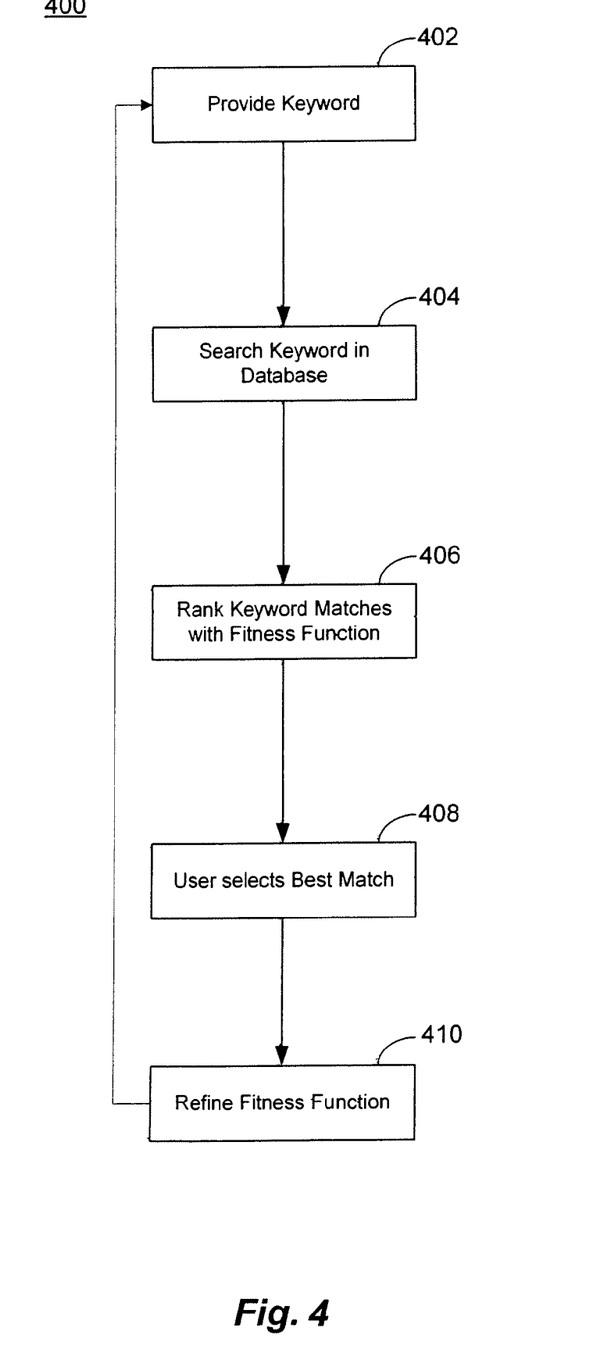
FIG. 4 shows a flowchart of refining a fitness function used to rank keyword search results according to an embodiment of the invention.

FIG. 4 shows a flowchart of a method 400 for refining a fitness function used to rank keyword search results according to an embodiment of the invention. The method 400 includes providing a keyword 402 to a search program so that the program can execute a search of the keyword on a designated database. As noted above, the database may be associated with a single storage device, or may be distributed across a network, such as the Internet.

The search program searches for the keyword 404 and may directly search database text for a keyword match, or may search metadata associated with and describing the contents of the information contained in the database. Once the search program has found keyword matches, a fitness function associated with a genetic algorithm ranks the keyword matches 406 based on which matches the function thinks a user would most likely choose as the best match for that search query.

A user then selects the best match from the set of keyword matches that have been ranked by the fitness function. The fitness function is then refined 410 based on the user's selection of the best match so that the fitness function has a better probability of ranking the best match highest for future searches on that keyword, or set of keywords.

Free Producer Bulletin Board

The Free Producer Bulletin Board ("Free Producer BB") can be thought of as a marketplace where agents purchase the right to represent web pages, including newly created web pages and web pages that may be recycled from expired agents. For example, new web pages may be added to the system from the Internet via a web-crawler discovery service. The crawler creates and initializes objects that represent the new web pages and then passes references to the objects to the Free Producer BB. The web pages may then be distributed to the agents through a publicly accessible auction process.

In the case of newly created web pages, the Free Producer BB may receive information about a new web page that has been placed on a distributed network (e.g., the Internet) and tries to find an agent to represent the web page. For example, new web pages may be added to the Internet via the pAdder web-crawler. The crawler creates and initializes objects that represent new web pages and then passes objrefs of the objects to the Free Producer BB.

The Free Producer BB may attempt to find an agent for a new web page through a free market bidding process. The bidding process may include placing an entry on the bulletin board that includes the new web page's content summary and keyword list. The entry may also be associated with a field for the time left to bid on the web page, and a field for the current high bid. Each entry on the bulletin board may be publicly visible to the agents, which check the board for web pages that match their subjects of interest. At the end of the action, the web page is sold to the agent that made the highest bid. Agent behavior may encourage the purchase of new web pages from the bulletin board, provided the bid price makes economic sense for the agent.

Web pages that are represented by at least one agent are usually more likely to be presented in search results than non-represented web pages. Non-represented web pages, however, may still be presented in search results to a user's search query. For example, information on non-represented web pages may be searched on the Free Producer BB, and if a close match is found the web page may be presented as a query response. Searching non-represented web pages on the Free Producer BB may be done directly by the user query search program and/or an agent looking for better matches before bidding on a user query.

Stork Server

A stork server is where new agents may be created from the genetic material of two or more parent agents. A new agent may be created when two or more parent agents send a new agent request to the server. The request may include the objrefs of the parent agents. The stork server then asks each parent agent for its genetic material.

As noted above, genetic material comprises the individual states of a set of behavioral rules that influence the behavior of an agent. For example, the genetic material may comprise a set of 64 bits where the value of each bit indicates whether the behavioral rule associated with the bit is active in the agent (i.e., whether that particular behavioral rule is turned on or off in the agent).

The genetic material received from the parents is combined into a new genetic code that forms and initializes an offspring agent. The genetic material of the offspring agent may be taken equally from each parent. Which bit values are taken from which parent may be determined at random. Alternatively, probabilities may be assigned for the state of some or all of the bits to establish whether a new agent inherits that bit value. This process is analogous to dominant/recessive behavior of genes in biological systems. In addition, some of the inherited bit values may be changed at random to introduce the concept of genetic mutation into agent reproduction.

Once the new agent is formed and initialized, its objref may be passed to both of the parents, who may link it into the association tree and "will" it resources.

Agents

As noted above for one example, an agent's behavior may be determined by 64 behavioral rules. These behavioral rules give an agent its personality. Rules are represented by as bits, which are collected together in a 64 bit behavioral genome. Each agent's behavioral genome is determined through inheritance from its parents and random mutation.

The behavioral rules of the agents may represent a number of behavioral characteristics including, for example, when and how often a agent reproduces, its bidding method, and when it attempts to acquire additional suppliers. All the various combinations possible with a 64 bit behavioral genome permits an agent to express complex behavior using a simple format.

Agents may represent suppliers. A supplier may be an object sub-classed from the abstract class called supplier, which may also include agents and information producers. An agent may represent one or more suppliers, or alternatively the agent may be a free agent that does not represent any suppliers.

Free agents may result from agent reproduction or as a side effect of association agreements. Since free agents have no web page information, they do not place bids on the Bidding BB. However, they may bid to represent web pages on the Free Producer BB, or enter into association agreements.

When a search-engine is first started it may comprise a number of free agents. New agents may be created through the process of agent reproduction. Agents may reproduce at their discretion. In one example, agents may not be able to both reproduce and bid on a search query simultaneously. If they have a bid pending, or their bid has been accepted, they can't reproduce at that time.

To reproduce, an agent needs to find at least one partner. In one example, the mating process may be supported via "proposal" methods where offer and acceptance are at the discretion of the agents. Once an agreement is arrived at, the initiating agent may contact a stork server to actually create an offspring agent.

As noted above, offspring agents may get genetic material (and therefore behavioral rules) equally from both parents. They may become subordinate to one or more parent agents (e.g., they may become suppliers to their parents.) Offspring agents may receive credits and suppliers from each parent. Offspring funding may be determined through the parent's behavioral rules.

Agents place bids on the Bidding BB in an effort to be awarded credits. Agents watch the bulletin board looking for subjects they might be able to bid on. An agent may maintain a summary of the information it represents and a list of subjects it has previously been successful with. When a matching subject appears on the Bidding BB, the agent may respond with a bid according to its behavioral rules.

All bids for a particular user query may be publicly visible. When an agent sees a bid from one of its subordinates, it may change its bid, cancel it or decide not to bid. Agents may note other agents that frequently bid on related subject material by watching the bidding. These other agents may be good candidates for association or reproduction.

Accepted bids cost capital and successful bids award capital. Agents may maintain their own bank balances. When an agent's capital hits zero, the agent may be responsible for returning any suppliers it might represent to the Free Provider BB and liquidating itself.

If a bid is successful (i.e., the user selects it) the bidding agent receives capital for it. The winning agent may pass a portion of the resulting capital to a supplier that provided the information. The supplier, in turn, may pass a portion of the capital it receives to another agent who supplied the supplier with the winning information. This process may be repeated for all agents in the chain that helped supply the winning information.

Information Producers

A class to encapsulate URLs may also be included with the present invention. This "InformationProducer" class provides a standard way for other components of the system to identify, search and link web pages into associations. The class provides a standard, object based distribution mechanism for URLs.

As noted above in an example, new web pages were added to the system by a web-crawler known as pAdder. In this example, when pAdder finds a new, previously unreferenced URL it creates a new instance of the class InformationProducer, calls its initialize routine, and hands the resulting object off to the Free Producer Bulletin Board. The Free Producer BB then tries to find the InformationProducer an agent through auctioning it off to the highest bidder.

A new InformationProducer instance may initialize itself by creating a link to the URL it represents. The contents of the URL itself are not required to move. Then, the new object scans the contents of the URL, creating a summary of its contents and a keyword list. The summary and keyword list, along with the URL and an indication of the size of the page, may become part of the instance's persistent state.

Once initialized, the object is prepared to respond to inquiry methods. The object may return a document summary or a keyword list. These are "free" services. It may also do a full text search, but a fee may be charged for this service. The fee is assessed in proportion to the difficultly of the search, and there may include a method of estimating the fee before actually performing the search.

The class "InformationProducer" is a subclass of supplier, so it may be linked into an association tree where other suppliers can be linked. This class may form a leaf-node of the association tree.

The Distributed Bulletin Board

Figure 5:
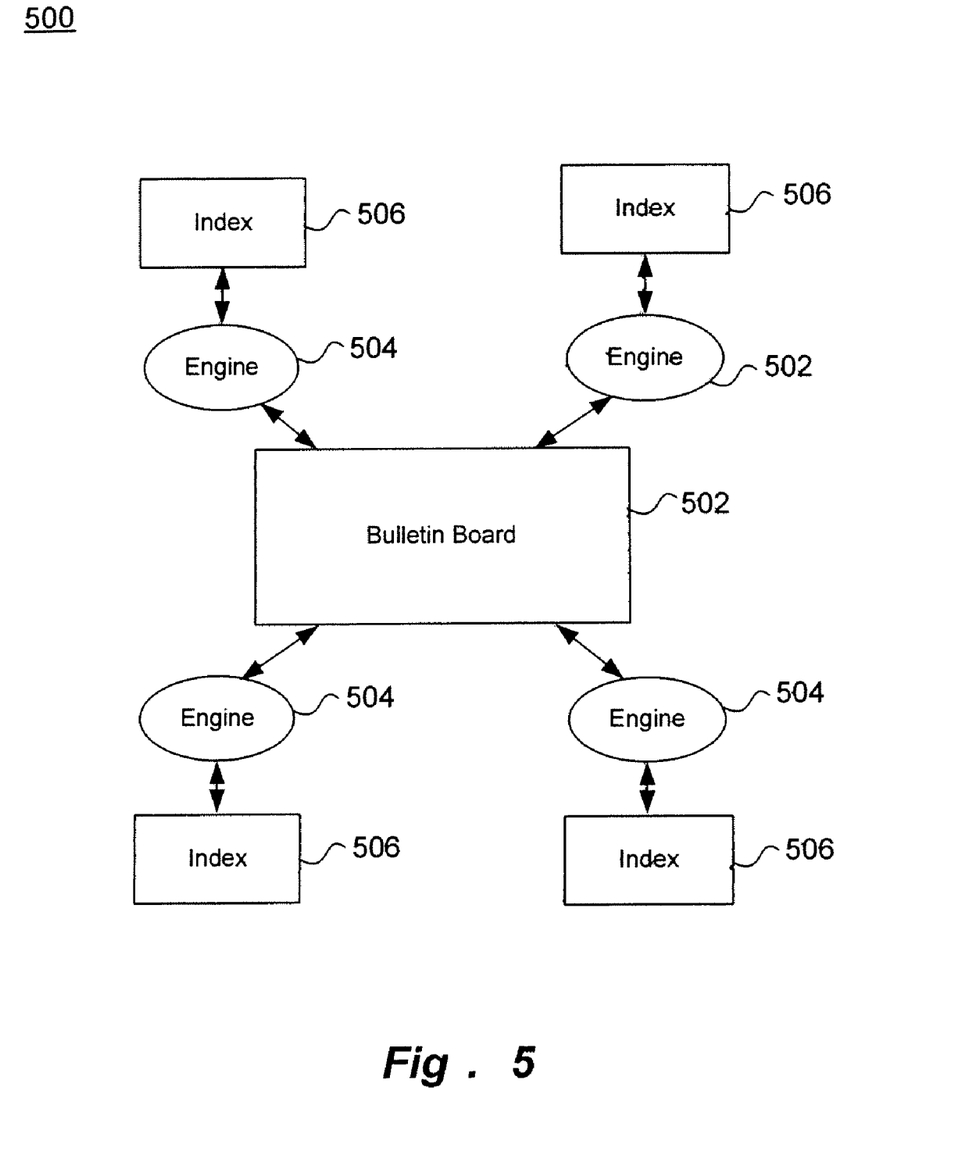
FIG. 5 shows an example of a bulletin board in a non-distributed environment according to an embodiment of the invention.

Bulletin boards in the present invention may run in a distributed or non-distributed environment. Referring to FIG. 5, an example of a bulletin board in a non-distributed environment 500 is shown. The bulletin board may be located in a block of memory 502 that is coupled to the search engine instances 504, which are also coupled to indexes 506.

In the non-distributed environment 500, threads of control have the ability to access common memory 502. As search requests are received from the search engines 504, they are posted to the bulletin board in memory 502. Instances 504 of the search engine regularly monitor the bulletin board, looking for new postings. By having the search engine instances 504 posting to common memory 502, the overhead of a more complex protocol for communicating between the instances 504 is avoided. For example, a mutual exclusionary lock may provide data consistency between search engine instances 504.

Figure 6:
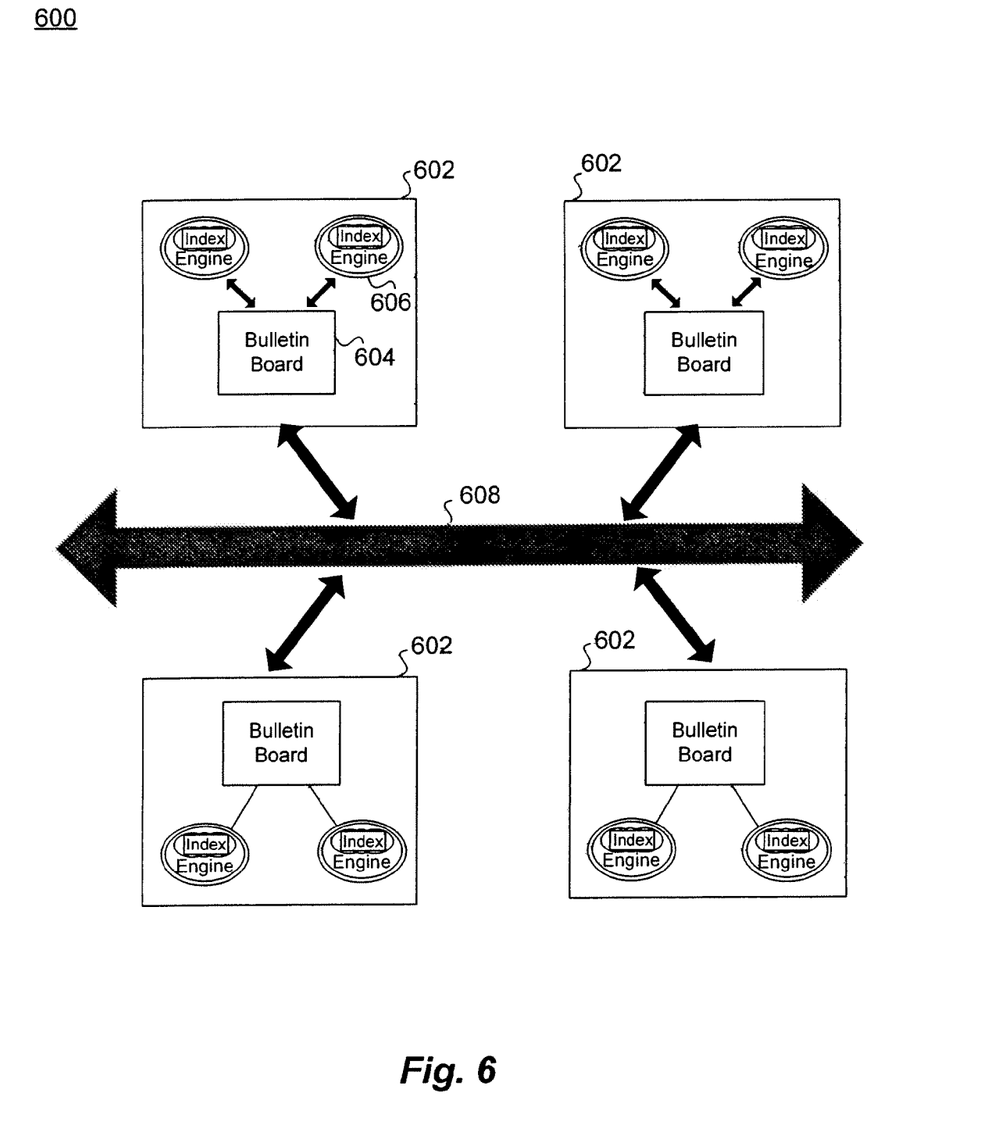
FIG. 6 shows an example of a bulletin board in a distributed environment according to an embodiment of the invention.

The present invention also includes examples where the bulletin board exists in a distributed environment on non-contiguous memory segments. FIG. 6 shows an example of a distributed bulletin board running in distributed environment 600. A bulletin board in a distributed environment 600 includes an infrastructure to support the distribution of search requests, and collect and prioritize responses to search requests, among other functions. For example, a messaging infrastructure may include an Object Request Broker, and a COSS event service to assist in handling asynchronous events.

Each of the multiple search engine instances 602 may include a distributed bulletin board 604 that is coupled to other instances of bulletin board 604 through an inter-host communication mechanism 608. Search engine instances 602 and bulletin boards 604 may be instantiated as distributed objects.

Each of the search engine instances 602 may be responsible for searching locally controlled index segments 606. Taken together across the distributed environment, index segments 606 comprise the index space. Coupling the search engine instances 602 can provide concurrency without exclusionary concerns. Individual index segments 606 may be encapsulated with their own private search engine, eliminating synchronization problems in multiple access, coupled environments.

Shared access allows data from multiple sources to be seen by all. When posting to an instance of bulletin board 604 from multiple sources, responses can be written back to, and associated with, the original posting. Response posting provides a form of feedback, giving individual search engine instances 602 the ability to optimize their responses. In designing distributed bulletin board architectures, protocols and distribution tools may be chosen to reduce latency and programmatic complexity while maximizing bandwidth.

Figure 7:
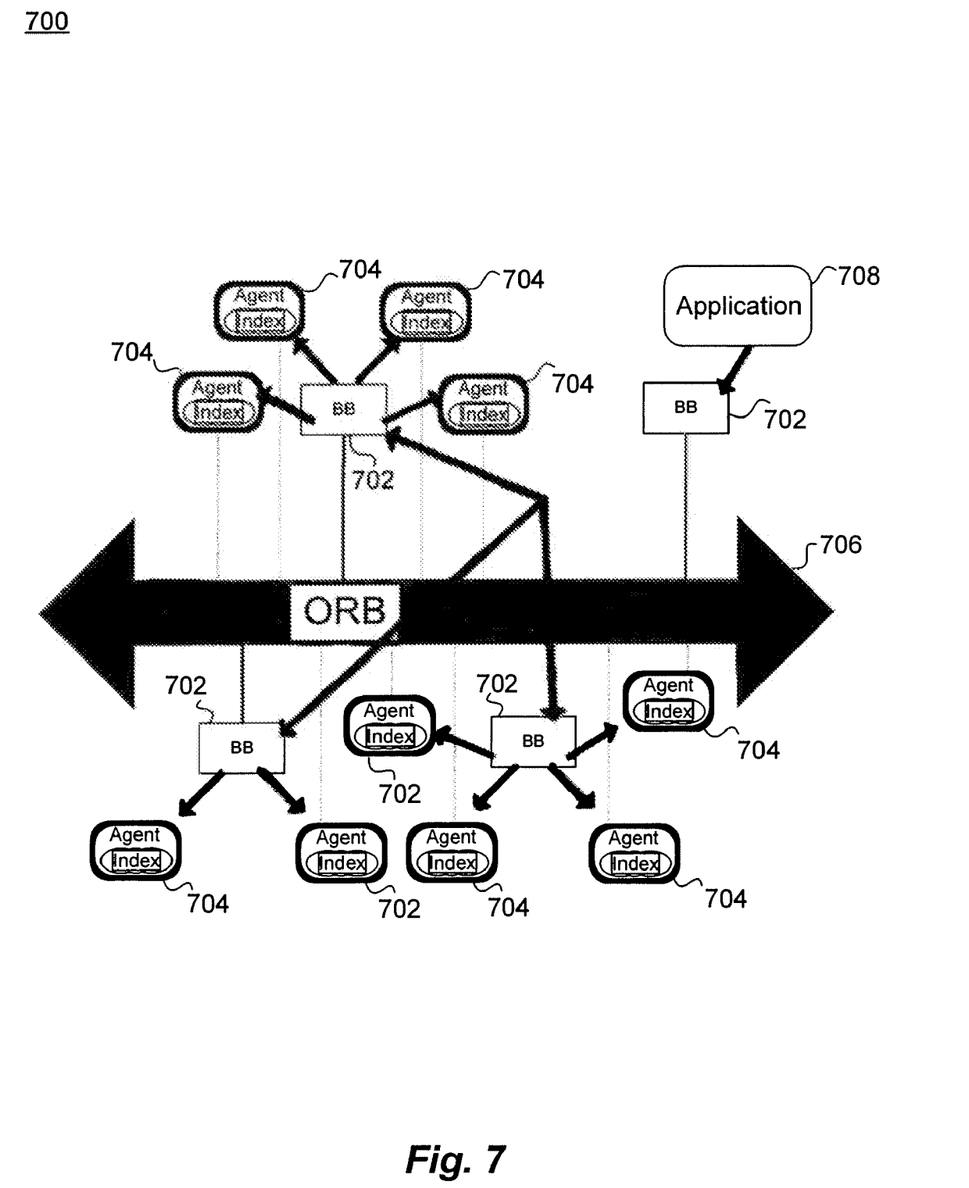
FIG. 7 shows another example of a bulletin board in a distributed environment according to an embodiment of the invention.

Another example of a distributed bulletin board 700 running in a distributed environment is shown in FIG. 7. In this example, the distributed bulletin board 700 is implemented as a collection of distributed bulletin board objects 702 running on an arbitrary number of servers within an OMA-compliant distributed object environment (where OMA stands for Object Management Architecture, the Object Management Group's reference architecture.) Each host participating in the distributed bulletin board has at least one instance of the class BulletinBoard instantiated on it.

The distributed environment may include native ORB support, DOE support, and/or a communication gateway. For example, communication may be conducted by message passing using the environment's Object Request Broker ("ORB") 706.

A search in the distributed environment may start when an application 708 sends a search request message to any BulletinBoard object 702. An application 708 may include a process that sends a message via the ORB 706 to a distributed object, such as a BulletinBoard object 702. Application 708 may be, for example, a web server that responds to requests from clients.

In one example, the query is posted to the distributed bulletin board by sending a message to the closest BulletinBoard object 702. This instance of the BulletinBoard object 702 is distinguished for the lifetime of the query transaction and is referred to as the originating BulletinBoard. The originating BulletinBoard is responsible for arbitrating responses from other BulletinBoard object 702 instances. Any instance of the BulletinBoard class may be an originating object. The originating BulletinBoard may also be responsible for formulating a prioritized response to the search request. There may be several originating objects at any point in time, each being an originating BulletinBoard for one or more outstanding user search queries.

Segments of search engine instance index space may be represented as instances of the class agent 704. Agent objects 704 may register themselves with the closest BulletinBoard object 702 when they are first instantiated. In one example, agents 704 communicate exclusively with BulletinBoard object 702 running closest to them (e.g., running on the same computer). The closest BulletinBoard object 702 may found by sending a request to a BulletinBoard locator service, which returns the objref of the closest BulletinBoard object 702. The location of the BulletinBoard locator service may be indexed with a global tag that is programmed into agents 704.

The Distributed Search Process

Aspects of a search in a distributed environment according to an example of the present invention is now described.

Signaling the BulletinBoard Community

To perform as complete a search as possible of the distributed environment, the originating BulletinBoard instance solicits the help of other BulletinBoards that could potentially contain significant indexes. Upon receiving the search request, the originating BulletinBoard sends a searchPosted message to a shared event channel of the BulletinBoard community. Each BulletinBoard instance in the distributed environment may be coupled to the event channel as part of its initialization procedure. When a message is posted to the BulletinBoard's event channel, each BulletinBoard instance receives the message. The messages may be delivered asynchronously or, alternatively, on a polled basis to coupled BulletinBoard instances.

The searchPosted event message may include information about the originating BulletinBoard and may also include information about the search request. For example, the message may be a string containing information such as:

The originating BulletinBoard instance's objref

The ID of the search request

The time of day the request was made

The time to live of the request

A short summary of the search request

Information contained in the searchPosted event message may use state conditions of the originating BulletinBoard instance as a reference point. For example, the ID of the search request may be made unique by concatenating a sequential search request ID value with the objref of the originating BulletinBoard instance. The time of day field, which gives the BulletinBoard community an opportunity to synchronize their clocks via a series of offsets of the request, may be the local time of the originating BulletinBoard instance's server.

Posting a Request

A searchPosted event message may be presented to the entire BulletinBoard community in the distributed environment. Individual BulletinBoard instances post search request messages locally. An individual instance may not post every search request. Based on the results of previous search requests, an individual instance may decide that it has nothing to contribute. Alternatively, an instance may be too busy or lack sufficient resources to process another search request at that time. The originating BulletinBoard may or may not be notified when an instance does not post a particular search request.

The information in the searchPosted event message may be limited to what is required by all the servers in the distributed environment for initiating a search to reduce communication overhead. The searchPosted event message may contain the information to evaluate a search request. If additional information is desired or required, it may be obtained from the originating BulletinBoard. The originating BulletinBoard may have the largest set of information about a pending search request it has originated and may also have information about expired search requests.

Information received by BulletinBoards from searchPosted event messages may be stored in a pendingSearches list. Agents in communication with the BulletinBoard instance may be informed about the new searchPosted event message. Agents in this example may be thought of as representatives of searchable segments of indexes. Agents monitor the contents of their local BulletinBoard instances, looking for new search requests. When an agent finds, or is informed about a new search request, it searches the segments it represents for information that potentially matches the search request. The agent may assign each potential match a goodness-of-fit qualifier. The agent then presents the best matches in its segment, as a group, to the BulletinBoard.

An agent may be an instance of the IDL-defined class "Agent." Agent and BulletinBoard objects may be subclasses of a common IDL class, and they may share a common protocol. For example, one difference between an agent and a BulletinBoard may be the ability to receive notifications from a common event channel. Agents may represent other agents, which may ultimately represent one or more searchable index segments. In this way, a graph of relationships can be built which represents real, semantic associations between index segments.

Agents Search for Matches

Agents may register their interest with the local BulletinBoard instances as part of their initialization procedure. When a BulletinBoard instance posts a search request, it may alert all registered agents. Individual agents are responsible for searching through the indexes that they represent.

Complex searches of expansive index segments may take a relatively long period of time and the search time may increase still further due to intrinsic delays in a distributed system. The present invention may include a mechanism to limit the time spent on any one search. For example, a search request message may include a timeLeft field indicating the amount of search time left for the search request.

When a time limit is placed on a search request, agents may express their intent to respond to a search request in a timely fashion. If an agent finds that it represents an index with an appropriately high goodness-of-fit (as determined according to the bidding behavior of the agent), it may inform the local BulletinBoard instance of this fact in order to avoid being shutout of the search process. When an agent informs the local BulletinBoard instance of its intent to respond, the agent may be given the opportunity to respond to a lastCall message. An intentToRespond message sent by the agent may include information such as:

Number of matches found thus far

Highest goodness-of-fit value found thus far

Lowest goodness-of-fit value found thus far

Size of summary buffer required by matches found

In response to the intentToRespond message, the BulletinBoard instance may return a message that may include information such as:

Highest goodness-of-fit from all other intentToRespond messages

Lowest goodness-of-fit from all other intentToRespond messages

Time remaining in search

Total number of matches from all other intentToRespond messages

Total size of buffer space available to summarize all messages

The information returned to the agent is used to modify its search. For example, the agent may abandon a search if the agent's highest goodness-of-fit is lower than the lowest goodness-of-fit returned by other agents, there are several other replies, and the timeLeft is short.

Updating the Originating BulletinBoard

BulletinBoard instances may receive status updates from the agents coupled to them at regular intervals. The BulletinBoard instances may summarize this information and send it to the originating BulletinBoard instance. This may be done with the same intentToRespond mechanism that agents use when communicating with BulletinBoards. In this situation, the originating BulletinBoard instance may receive the intentToRespond messages from other BulletinBoard instances the same way it receives them from its coupled agents.

The originating BulletinBoard instance may be the root of an intentToRespond tree. It may organize information received from agents and BulletinBoard instances into a summary that may be used in response to intentToRespond messages. This summary may also be available to an application via the object monitoring protocol.

Last Call

The originating BulletinBoard may issue a lastCall message to objects (e.g., BulletinBoard instances, agents) that have sent it an intentToRespond message. When the originating BulletinBoard sends the a lastCall message, subsequent intentToRespond messages may be ignored. Objects may respond to a lastCall message with a message that includes information such as:

Number of matches found
Highest goodness-of-fit value found
Lowest goodness-of-fit value found
Size of summary buffer required by matches found Summaries Sent The originating BulletinBoard evaluates the information sent by objects in response to the lastCall message, and may send a sendSummary message to the most promising candidates (e.g., the objects with the highest goodness-of-fit values.) The sendSummary message may include information such as:

Lowest goodness-of-fit to send
Size of summary buffer available

Objects receiving a sendSummary message may return the matches they have found. If the object has associated agents, it may dispatch sendSummary messages allocating a portion of the available message space to them. Summary information may be returned formatted as HTML strings.

All Clear

The originating BulletinBoard may send an allClear event to the BulletinBoard common event channel. BulletinBoard instances may, in turn, send an allClear message to all registered agents. The allClear message indicates that the search request process is complete, and may also signal to objects that they may reclaim any storage allocated to processing the search.

Rich Media Repository

In another example of the present invention, search engine systems and methods may be used for searching a rich media repository. A rich media repository may include an environment that expedites the discovery and retrieval of rich text and graphical materials, such as, for example, text and graphics found in illustrated publications. Rich media repositories may also include video and audio elements such as interactive multi-media documents. Rich media repositories are used by, among others, designers involved in the development of publications and interactive, consumer oriented multi-media documents (e.g., web pages).

A rich media repository includes an environment that expedites the discovery and retrieval of rich media elements. Examples of rich media elements include, without being limited to:

Rich text: Text with embedded font
Images: Photographically or geometrical images
Video: Time-series related images with audio
Audio: Time-series of complex frequencies
Layouts: Spatially related rich text elements.

Rich media elements usually come into being as part of the development of some larger document. For example a retail products catalog comprises a plurality of rich media elements. A typical catalog has a number of pages, each having variable formatting, comprising one or more cells. Cells may include a number of types of graphical elements, including images, graphics, and text with embedded fonts. The spatial relationship of rich media elements within a cell and cells within a page determines the appearance of a printed page. Composition tools may be used to establish spatial relationships between elements. Pages may also be related to one another, typically in contextual and/or sequential manner.

A rich media element may generically refer to a broad range of graphical elements. Examples of rich media elements include, without being limited to, a paragraph of rich text (e.g., postscript), a multilayer image with associated rich text, video, and audio elements. A rich text element may be hierarchical (e.g., made up of multiple, spatially related rich media elements.)

Rich medial elements may be spatially associated (e.g., positionally related to one another) on, for example, a printed page. Spatial associations convey visual attributes. Non-spatial associations are elements associations in some other sense. For example, an index of a retail catalog represents a non-spatial association. Another example of a non-spatial association would be catalog cells that describe the same product in different ways. Non-spatial associations may be captured with a hypertext link without loss of content.

Examples of the present invention include systems and methods to search for rich media elements in a rich media depository. This includes, for example, searching rich media elements as opaque objects in addition to, or in lieu of file representations of the objects.

In an example of the present invention, rich media elements are treated as descendents of a common parent. This enables semantic association trees to be built around elements that capture complex relationships between them based on meaning rather than syntax. Rich media elements may also be treated generically, thereby eliminating special case dependencies.

In an example, rich media element search systems and methods are referred to as distributed object technology. Distributed object technology may include searching objects that are independent of a specific application. It also permits storing and searching objects independent of platform and physical host boundaries. Objects may be processed on the same physical host holding the rich media elements, providing improvements in scalability and availability.

Users may interact with the repository through a web browser (e.g., Netscape Navigator, Microsoft's Internet Explorer, etc.) The web browser supports standard Internet transfer protocols, including XML, hypertext transfer protocol (HTTP) and its associated page layout language, hypertext markup language (HTML), which is a simplified version of the standard simple graphic markup language (SGML). Page layouts may be represented using HTML.

In an example, the interactions between the user and the repository take place via web pages displayed by the web browser, and a user may select items using the point and click model. Rich media elements may be browsed through hypertext links. Fill-in forms may be used to do discovery searches. The interaction is platform independent.

Web browser clients may interact with a web server. The server may translate a subset of the universal resource locator's (URL) namespace into distributed object references so the server can send requests to the distributed objects that make up the rich media repository.

Requests to add a rich media element to a repository may be sent to a check-in application. Requests to search for a rich media element in a repository may be sent to the discovery engine.

The check-in application creates an entry in the association cache. Several types of entries may be stored in the association cache, including an InformationProvider entry containing a pointer to a rich media element and a summary of the element's contents. The association cache may also store an Agent entry that contains associations linking InformationProviders together. When a rich media element is being checked-in, an InformationProvider entry may be automatically created. If a web page containing explicit associations (e.g., links to rich media elements) is being checked-in, an Agent entry may be created.

The discovery engine may use an association cache to resolve discovery requests. Summary information may be a source of information to resolve the user's search query. Associations between elements provide further clues.

Each rich media element may be stored in its own file in the repository. Rather than modify an element's representation file, a stand-in may be created to represent the element for the purpose of system interaction. This stand-in may be an object subclassed from InformationProvider.

InformationProvider objects provide the repository with a summary of the elements' representations. This summary may include the author name, the date the file was created and last modified, keywords, an outline, and a short summary, among other information. The summaries may be formatted as ASCII strings or generic detail, reduced summaries (e.g., summarizing a graphic image as set of polygons.) Summaries may be created manually or automatically.

When a rich media element is added to the repository, its InformationProvider object may be added to at least one agent's associate list. Agent selection may be automatic or specified by an operator. If the proper location for an element is not determined, the element may become part of a default association called the pool. Associations may be based on, for example, ownership, group association, file type, or other types of associations that fit organizational needs.

In this example, agents are objects that can form useful associations between InformationProviders. These associations, the physical manifestation of which users see in web page documents, may be used as discovery tools. An agent may represent elements that share common attributes. If a user discovers an element close to what she or he is looking for, but not exactly right, an agent provides associated elements from its associates list that has a higher than average probability of being the right element. Agent associations may be formed manually or continuously based on usage patterns.

The decision to use a specific design element may come about explicitly or through a discovery process. In explicit selection the user explicitly selects a key that indexes the desired rich media element. To explicitly select a design element, the user normally knows that the desired design element exists and has some knowledge about the relationship between the key and the desired element.

Explicit selection is most appropriate when the user has knowledge of the desired element. In many cases however, the user either knows what he wants but doesn't know where it is, or has a vague idea of what is required and is looking for external guidance. This may be referred to as discovery. The rich media repository provides a number of modes to support discovery including a search mode and a browse mode. In the search mode, the repository may accept search criteria from the user and return a set of elements matching the criteria. In the browse mode, the repository may respond to selections of the user by providing more detail on the selected element.

The repository's discovery modes may be complimentary and can be used in combination to discover an appropriate rich media element. Searches do not have to be precise: Unless a query is very precisely defined searches typically return a number of potentially matching elements. Additional searches may further limit the number of matching elements, but at some point it may be more efficient to browse the results. Similarly, browsing is useful to gather a sense of what's available, but browsing a large repository may be extremely time consuming unless the collection of browsed elements is narrowed by searching.

Formulating an effective query against a large database of complex, abstract elements where the user lacks explicit knowledge about the desired results is challenging. An effective query is formulated to balance the desire to narrow the number of search results with the desire to ensure that all valid candidates are included.

The rich media repository may use adaptive association trees to increase the potential effectiveness of discovery searches. An adaptive association tree uses agents to formulate potentially useful associations between InformationProviders. These associations are designed to adapt by observing and reacting to successful search patterns.

For example, when a user makes a discovery search the contents of the search query may be posted to a bulletin board that is accessible to the bidding agents. An agent evaluates its associations to see if they can respond to the query. They express their level of interest by bidding for the right to respond to the query. After some period of time, the bidding is closed and the highest bidder(s) are presented to the user as result candidates. The user selects the best match using the browser and the winning agent is rewarded in proportion to its bid. Other agents observe the results of the successful bidding behavior and modify their behavior and associations to maximize their potential of a positive outcome in the next round of bidding.

The agent bidding process may be transparent to the user. The user may simply see a list of hypertext links that represent potential matches to the search query.

From the perspective of a user working with a web browser, the agents may appear as web pages, displaying their list of associates as hypertext links. When the user selects a hypertext link, the contents of the association is displayed. This may be another agent or an InformationProvider. InformationProviders can also have hypertext links to other InformationProviders or agents. Associations, realized as agents, can be formed by way of adaptive behavior or created manually based on other criteria.

The rich media repository may also support OpenDoc functionality. When an element is selected, the environment that the element was created under becomes active. Rich media elements may be dragged from the repository directly into a new document. The element is not physically duplicated until changes are made to it. Alternatively, the repository may indicate where the selected element's representation file is located and the user may use standard file transfer utilities to move it onto a platform for execution.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The words "comprise," "comprising," "include," "including," and "includes" when used in this specification and in the following claims are intended to specify the presence of stated features, integers, components, or steps, but they do not preclude the presence or addition of one or more other features, integers, components, steps, or groups.

I claim:

1. A system for conducting a computer based search of web pages available over a network comprising:
   a bidding bulletin board to post a user search query from a user, wherein the user search query includes at least one keyword;
   a plurality of agents that each submits a bid to the bidding bulletin board in response to the user search query, wherein each of the agents is associated with a search result associated with at least one of the web pages; and
   a display server to display a subset of the search results to the user if the bidding bulletin board accepts the bids of the agents represented by the subset, wherein an amount of the bid by the agent is determined by behavioral rules for the agent, wherein the behavioral rules differ for at least a portion of the agents, and wherein the bidding bulletin board accepts or rejects the bids of the agents based on the bid amounts.

2. The system of claim 1, wherein the agent has at least one credit when submitting the bid to the bidding bulletin board.

3. The system of claim 2, wherein the agent is charged at least one credit if the bidding bulletin board accepts the bid of the agent.

4. The system of claim 2, wherein the agent receives at least one credit when the search result chosen by the user is associated with the agent.

5. The system of claim 2, wherein the agent expires when the amount of credits it holds is zero or less.

6. The system of claim 1, wherein each of said behavioral rules for the agent has a state, where said state is active or inactive.

7. The system of claim 6, wherein said amount bid by the agent is determined by the behavioral rules in the active state.

8. The system of claim 1, wherein the behavioral rules of the agent are inherited from two or more parent agents.

9. The system of claim 1, wherein the system comprises a rich media depository comprising a rich media element.

10. The system of claim 9, wherein the search result comprises a link to said rich media element.

11. The system of claim 1, wherein the search result comprises a link to a source web page and wherein said display server displays a web page comprising the search result.

12. A method for conducting a computer based search of pages available on a digital communications network comprising:
    posting a user search query from a user on a bidding bulletin board;
    receiving a bid from a plurality of agents at said bidding bulletin board in response to the user search query, wherein each of the agents is associated with a search result providing a link to and summary of one of the pages; and
    displaying a subset of the search results to the user when the bulletin board accepts a subset of the bids of the agents based on a ranking of amounts of the bids, wherein the bid amounts submitted by each of the agents is determined by behavioral rules for each of the agents.

13. The method of claim 12, wherein said method comprises taking at least one credit from a credit account associated with the agents if the bidding bulletin board accepts the bid of the agent as payment for the displaying.

14. The method of claim 13, wherein said method further comprises giving at least one credit to the agent if the user selects the search result associated with the agent.

15. The method of claim 14, wherein the agent expires if the amount of credits it holds is zero or less.

16. The method of claim 12, wherein each of said behavioral rules has a state, and said state is active or inactive.

17. The method of claim 16, wherein said state of said each of the behavioral rules of the agent is inherited from a parent agent.

18. The method of claim 16, wherein said amount to bid by the agent is determined by the behavioral rules in the active state.

19. A search method for facilitating effective searching for web pages on a digital communications network, comprising:
    providing a search bulletin board accessible by users of the network for receiving search requests from the users, wherein each of the search requests specifies query information;
    generating a plurality of search engine agents associated with the search bulletin board and each operationally defined by a set of behavioral rules active in the agents, wherein the behavioral rules differ for at least some of the agents;
    operating at least a portion of the agents to become owners of one or more of the web pages,
    receiving a new search request at the search bulletin board from one of the users;
    operating the search bulletin board to provide access to the new search request by each of the agents;
    with each of the agents that own one or more of the web pages, processing the query information in the new search request to identify a matching one of the owned web pages and generate a search result for the matching ones;
    based on the active behavioral rules, forming a bid having a bid amount with the agents that identified the matching ones of the owned web pages;
    operating at least a portion of the agents that identified the matching ones to submit the formed bids including the bid amounts to the search bulletin board;

operating the search bulletin board to accept one or more of the search results based on the bid amounts of the bids; and displaying to the user associated with the new search request the accepted one or more of the search results.

20. The method of claim 19, wherein each of the agents has a credit balance, wherein the credit balance is decreased for the agents associated with the accepted one or more of the search results, wherein the method further includes receiving input from the user selecting one of the displayed search results and the credit balance is increased by the bid amount in the bid submitted by the agent associated with the user selected on of the displayed search results.

21. The method of claim 19, wherein the set of behavioral rules comprise a rule causing the agents to periodically produce a new one of the agents by combining at least a portion of their set of behavioral rules with at least a portion of a set of behavioral rules of another one of the agents and wherein each of the agents is configured to modify the set of behavioral rules at least intermittently based on results of the operating of the search bulletin board to accept one or more of the search results.

* * * * *